(12) United States Patent
Li et al.

(10) Patent No.: US 10,250,646 B2
(45) Date of Patent: Apr. 2, 2019

(54) METHOD AND DEVICE FOR ESTABLISHING CHANNEL

(71) Applicant: Huawei Technologies Co., Ltd., Shenzhen (CN)

(72) Inventors: Jing Li, Shenzhen (CN); Zhenhua Tian, Shenzhen (CN); Wanling Ye, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 15/242,244

(22) Filed: Aug. 19, 2016

(65) Prior Publication Data
US 2016/0359927 A1  Dec. 8, 2016

Related U.S. Application Data

(63) Continuation of application No. PCT/CN2015/070523, filed on Jan. 12, 2015.

(30) Foreign Application Priority Data

Feb. 21, 2014 (CN) .......................... 2014 1 0061239

(51) Int. Cl.
  *H04L 29/06* (2006.01)
  *H04L 29/08* (2006.01)
(52) U.S. Cl.
  CPC .......... *H04L 65/1069* (2013.01); *H04L 29/06* (2013.01); *H04L 65/104* (2013.01);
  (Continued)
(58) Field of Classification Search
  USPC ................................ 709/228, 200, 206, 227
  See application file for complete search history.

(56) References Cited

U.S. PATENT DOCUMENTS 8,861,692 B1 * 10/2014 Phelps ................. H04M 15/39
                                                          370/401
2011/0010459 A1    1/2011 Stokking et al.
(Continued)

FOREIGN PATENT DOCUMENTS

CN          101953136 A       1/2011
CN          103404132 A      11/2013
(Continued)

OTHER PUBLICATIONS

Handley et al., "SDP: Session Description Protocol," Network Working Group, Request for Comments: 2327, The Internet Society, Reston, Virginia (Apr. 1998).
(Continued)

*Primary Examiner* — El Hadji M Sall
(74) *Attorney, Agent, or Firm* — Leydig, Voit & Mayer, Ltd.

(57) ABSTRACT

Embodiments of the present disclosure provide a method and a device for establishing a channel, capable of reducing data transmission path length when two WEBRTC terminals transmit data based on an IMS network, reducing network delays, and reducing load of a media gateway device. The method includes: receiving, by a WEBRTC signaling gateway device, a session request message transmitted by a WEBRTC terminal serving as a calling terminal, where the session request message comprises an identifier of a called terminal, determining that the called terminal is a WEBRTC terminal according to the access mode in which the called terminal accesses a WEBRTC signaling terminal, and transmitting the session request message to the called terminal via the WEBRTC signaling gateway device accessed by the called terminal, to enable the calling terminal to establish an end-to-end media channel between the calling terminal and (Continued)

the called terminal according to the session response message.

13 Claims, 6 Drawing Sheets

(52) U.S. Cl.
CPC ...... *H04L 65/1006* (2013.01); *H04L 65/1016* (2013.01); *H04L 65/1033* (2013.01); *H04L 67/02* (2013.01)

(56) References Cited

U.S. PATENT DOCUMENTS

| | | | |
|---|---|---|---|
| 2014/0044123 | A1 | 2/2014 | Lawson et al. |
| 2014/0095724 | A1* | 4/2014 | Yoakum ............ H04L 29/08054 709/228 |
| 2014/0222963 | A1* | 8/2014 | Gangadharan ...... H04L 65/1016 709/219 |
| 2015/0106438 | A1 | 4/2015 | Fan et al. |
| 2015/0350723 | A1 | 12/2015 | He |

FOREIGN PATENT DOCUMENTS

| | | |
|---|---|---|
| CN | 103580986 A | 2/2014 |
| CN | 104113511 A | 10/2014 |

OTHER PUBLICATIONS

Baugher et al., "The Secure Real-time Transport Protocol (SRTP)," Network Working Group, Request for Comments: 3711, The Internet Society, Reston, Virginia (Mar. 2004).

"Series H: Audiovisual and Multimedia Systems; Infrastructure of audiovisual services—Systems and terminal equipment for audiovisual services; Packet-based multimedia communications systems; Amendment 1: Use of Facility message to enable call transfer," Recommendation ITU-T H.323—Amendment 1, pp. i-1, International Telecommunication Union, Geneva, Switzerland (Mar. 2013).

Alvestrand, "Overview: Real Time Protocols for Brower-based Applications," Network Working Group, Internet-Draft, Internet Engineering Task Force, Reston, Virginia (Feb. 14, 2014).

Johnston et al., "WebRTC: APIs and RTCWEB Protocols of the HTML5 Real-Time Web," Second Edition, pp. i-248, Digital Codex LLC, St. Louis, Missouri (Jun. 2013).

"$3^{rd}$ Generation Partnership Project; Technical Specification Group Services and System Aspects; IP Multimedia Subsystem (IMS) media plane security (Release 12)," 3GPP TS 33.328, V12.5.0, pp. 1-64, $3^{rd}$ Generation Partnership Project, Valbonne, France (Dec. 2013).

* cited by examiner

METHOD AND DEVICE FOR ESTABLISHING CHANNEL

CROSS-REFERENCE TO RELATED APPLICATIONS

This application is a continuation of International Patent Application No. PCT/CN2015/070523, filed on Jan. 12, 2015, which claims priority to Chinese Patent Application No. 201410061239.X, filed on Feb. 21, 2014, both of which are hereby incorporated by reference in their entireties.

TECHNICAL FIELD

The present disclosure relates to the field of communications and, in particular, to a method and a device for establishing a channel.

BACKGROUND

WEBRTC (web real-time communication) is the technology supporting a web browser to perform real-time audio conversations or video conversions, where a browser capable of performing WEBRTC communications is referred to as a WEBRTC terminal. The browsers performing real-time communications must support an SRTP (secure real-time transport protocol) to encrypt media resources, and support an ICE (interactive connectivity establishment) function to traverse an NAT (network address translation) device and firewalls.

An IMS (IP multimedia subsystem) is a network system architecture providing voice services, i.e. multimedia services, based on an IP network, which uses an SIP (session initiation protocol) to perform end-to-end call control, where a device or a soft terminal in conformity with an SIP standard protocol is referred to as an SIP terminal. Most of SIP terminals neither support the ICE function nor the SRTP.

In the prior art, a process of establishing a media channel between a WEBRTC terminal and a called terminal based on an IMS network by the WEBRTC terminal is: after registering in the IMS network successfully, the WEBRTC terminal transmits a session request message to a WEBRTC signaling gateway device, where the WEBRTC signaling gateway device applies for a media endpoint from a WEBRTC media gateway device after receiving the session request message, and the media endpoint converts a format of media data and terminates an ICE process, the WEBRTC signaling gateway device modifies an SDP (session description protocol) in the session request message, modifies an SRTP described by the SDP into an RTP, and deletes the ICE, then the WEBRTC signaling gateway device transmits the modified session request message to an IMS signaling gateway device, the IMS signaling gateway device transmits the modified session request message to the called terminal via the IMS network after applying for a media endpoint from an IMS media gateway device, the called terminal replies a session response message to the WEBRTC terminal, where both the session request message and the session response message include media candidate address information of media gateway device so as to enable the WEBRTC terminal and the called terminal to respectively establish a media channel between the WEBRTC/called terminal and a corresponding media gateway device according to the media candidate address information of the media gateway device. The media candidate address information of the media gateway device includes media candidate address information of the WEBRTC media gateway device or media candidate address information of the IMS media gateway device, then during data transmission, the WEBRTC media gateway device and the IMS media gateway device need to complete conversion of data formats, and the WEBRTC media gateway device also needs to terminate the ICE process.

It can be seen from the above descriptions that, when the called terminal is the SIP terminal, the above process may achieve good application effects, however, when the called terminal is the WEBRTC terminal, the above described data transmission process increases the data transmission path length, and increases network delays and load of the media gateway devices.

SUMMARY

The present disclosure provides a method and a device for establishing a channel, which are capable of reducing data transmission path length when two WEBRTC terminals transmit data based on an IMS network, reducing network delays, and reducing load of a media gateway device.

In order to achieve the above objective, the present disclosure employs the following technical solutions:

In a first aspect, a method for establishing a channel is provided, including:

receiving, by a first web real-time communication WEBRTC signaling gateway device, a session request message transmitted by a calling terminal, where the session request message includes an identifier of a called terminal, and where the calling terminal is a WEBRTC terminal;

transmitting a query request message including the identifier of the called terminal to a WEBRTC server, and receiving an access mode in which the called terminal accesses a WEBRTC signaling gateway device and a gateway identifier of the WEBRTC signaling gateway device accessed by the called terminal, where the access mode and the gateway identifier are transmitted by the WEBRTC server, and where the access mode includes accessing via WEB;

determining that the called terminal is a WEBRTC terminal according to the access mode, and transmitting the session request message to the called terminal via the WEBRTC signaling gateway device corresponding to the gateway identifier; and receiving a session response message transmitted by the called terminal, and transmitting the session response message to the calling terminal to enable the calling terminal to establish an end-to-end media channel between the calling terminal and the called terminal according to the session response message.

In a first possible implementation of the first aspect, the transmitting the session request message to the called terminal via the WEBRTC signaling gateway device corresponding to the gateway identifier includes:

determining that the WEBRTC signaling gateway device accessed by the called terminal is the first WEBRTC signaling gateway device according to the gateway identifier, and transmitting the session request message to the called terminal.

With reference to the first aspect, in a second possible implementation, the transmitting the session request message to the called terminal via the WEBRTC signaling gateway device corresponding to the gateway identifier includes:

determining that the WEBRTC signaling gateway device accessed by the called terminal is a second WEBRTC signaling gateway device according to the gateway identifier, and transmitting the session request message to the second WEBRTC signaling gateway device to enable the second WEBRTC signaling gateway device to transmit the session request message to the called terminal;

the receiving the session response message transmitted by the called terminal includes:

after the called terminal transmits the session response message to the second WEBRTC signaling gateway device, receiving the session response message transmitted by the second WEBRTC signaling gateway device.

With reference to any possible implementation in the first aspect to the second possible implementation, in a third possible implementation, the session request message includes media candidate address information of the calling terminal, the session response message includes media candidate address information of the called terminal;

correspondingly, the establishing, by the calling terminal, the end-to-end media channel between the calling terminal and the called terminal according to the session response message specifically includes:

establishing, by the calling terminal, the end-to-end media channel between the calling terminal and the called terminal according to the media candidate address information of its own and the media candidate address information of the called terminal.

In a second aspect, another method for establishing a channel is established, including:

after a first WEBRTC signaling gateway device receives a session request message transmitted by a calling terminal, receiving, by a WEBRTC server, a query request message transmitted by the first WEBRTC signaling gateway device, where the query request message includes an identifier of a called terminal, and where the calling terminal is a WEBRTC terminal;

determining an access mode in which the called terminal accesses a WEBRTC signaling gateway device and a gateway identifier of the WEBRTC signaling gateway device accessed by the called terminal according to the identifier of the called terminal, where the access mode includes accessing via WEB; and transmitting the access mode in which the called terminal accesses the WEBRTC signaling gateway device and the gateway identifier of the WEBRTC signaling gateway device accessed by the called terminal to the first WEBRTC signaling gateway device, to enable the first WEBRTC signaling gateway device to determine that the called terminal is a WEBRT terminal according to the access mode, transmitting the session request message to the called terminal via the WEBRTC signaling gateway device corresponding to the gateway identifier, and transmitting a received session response message to the calling terminal to enable the calling terminal to establish an end-to-end media channel between the calling terminal and the called terminal according to the session response message.

In a first possible implementation of the second aspect, the determining the access mode in which the called terminal accesses the WEBRTC signaling gateway device and the gateway identifier of the WEBRTC signaling gateway device accessed by the called terminal according to the identifier of the called terminal specifically includes:

querying, by the WEBRTC server, a corresponding relation stored therein according to the identifier of the called terminal, and determining the access mode in which the called terminal accesses the WEBRTC signaling gateway device and the gateway identifier of the WEBRTC signaling gateway device accessed by the called terminal, where the corresponding relation includes a corresponding relation among the identifier of the called terminal, the gateway identifier of the WEBRTC signaling gateway device accessed by the called terminal and the access mode in which the called terminal accesses the WEBRTC signaling gateway device.

With reference to the second aspect or the first possible implementation, in a third possible implementation, before the receiving the query request message transmitted by the first WEBRTC signaling gateway device, the method further includes:

receiving, by the WEBRTC server, an authentication message transmitted by the WEBRTC signaling gateway device accessed by the called terminal, where the authentication message includes an access code;

when it is determined that the access code is an access code assigned by the WEBRTC signaling gateway device accessed by the called terminal to the called terminal, storing the corresponding relation among the identifier of the called terminal, the gateway identifier of the WEBRTC signaling gateway device accessed by the called terminal and the access mode in which the called terminal accesses the WEBRTC signaling gateway device.

With reference to the second aspect or the first possible implementation, in a fourth possible implementation, if a WEBRTC server accessed by the called terminal is another WEBRTC server, before the receiving the query request message transmitted by the first WEBRTC signaling gateway device, the method further includes:

receiving a corresponding relation among the identifier of the called terminal, the gateway identifier of the WEBRTC signaling gateway device accessed by the called terminal and the access mode in which the called terminal accesses the WEBRTC signaling gateway device, where the corresponding relation is transmitted by the another WEBRTC server;

where the corresponding relation is stored when the another WEBRTC server receives an authentication message including an access code and it is determined that the access code is an access code assigned by the WEBRTC signaling gateway device accessed by the called terminal to the called terminal, where the authentication message is transmitted by the WEBRTC signaling gateway device accessed by the called terminal.

With reference to any possible implementation in the second possible implementation to the fourth possible implementation, in a fifth possible implementation, the method further includes:

after the called terminal is disconnected from the corresponding WEBRTC signaling gateway device, receiving an update request message transmitted by the WEBRTC signaling gateway device corresponding to the called terminal, and modifying the access mode in which the called terminal accesses the WEBRTC signaling gateway device according to the update request message.

A third aspect of the present disclosure provides a WEBRTC signaling gateway device, including:

a receiving unit, configured to: receive a session request message as transmitted by a calling terminal and a session response message transmitted by a called terminal, where the session request message includes an identifier of the called terminal; and further configured to: receive an access mode in which the called terminal accesses a WEBRTC signaling gateway device and a gateway identifier of the WEBRTC signaling gateway device accessed by the called terminal, where the access mode and the gateway identifier are transmitted by a WEBRTC server after a query request message transmitted by the WEBRTC signaling gateway device is received, the query request message includes the identifier of the called terminal, the calling terminal is a WEBRTC terminal, and the access mode includes accessing via WEB;

a determining unit, configured to determine that the called terminal is a WEBRTC terminal according to the access mode received by the receiving unit; and a transmitting unit, configured to: transmit the query request message including the identifier of the called terminal to the WEBRTC server; after the determining unit determines that the called terminal is the WEBRTC terminal, transmit the session request message to the called terminal via the WEBRTC signaling gateway device corresponding to the gateway identifier; and transmit the session response message to the calling terminal to enable the calling terminal to establish an end-to-end media channel between the calling terminal and the called terminal according to the session response message.

In a first possible implementation of the third aspect, the transmitting the session request message to the called terminal via the WEBRTC signaling gateway device corresponding to the gateway identifier specifically includes:

determining that the WEBRTC signaling gateway device accessed by the called terminal is the first WEBRTC signaling gateway device according to the gateway identifier, and transmitting the session request message to the called terminal.

With reference to the third aspect, in a second possible implementation, the transmitting the session request message to the called terminal via the WEBRTC signaling gateway device corresponding to the gateway identifier includes:

determining that the WEBRTC signaling gateway device accessed by the called terminal is a second WEBRTC signaling gateway device according to the gateway identifier, and transmitting the session request message to the second WEBRTC signaling gateway device to enable the second WEBRTC signaling gateway device to transmit the session request message to the called terminal;

correspondingly, the receiving the session response message transmitted by the called terminal specifically includes: after the called terminal transmits the session response message to the second WEBRTC signaling gateway device, receiving the session response message transmitted by the second WEBRTC signaling gateway device.

With reference to any possible implementation in the third aspect to the second possible implementation, in a third possible implementation, the session request message includes media candidate address information of the calling terminal, the session response message includes media candidate address information of the called terminal;

correspondingly, the establishing, by the calling terminal, the end-to-end media channel between the calling terminal and the called terminal according to the session response message specifically includes:

establishing, by the calling terminal, the end-to-end media channel between the calling terminal and the called terminal according to the media candidate address information of its own and the media candidate address information of the called terminal.

In a fourth aspect, a WEBRTC server is provided, including:

a receiving unit, configured to: after a first WEBRTC signaling gateway device receives a session request message transmitted by a calling terminal, receive a query request message transmitted by the first WEBRTC signaling gateway device, where the query request message includes an identifier of a called terminal, and where the calling terminal is a WEBRTC terminal;

a determining unit, configured to determine, according to the identifier of the called terminal received by the receiving unit, an access mode in which the called terminal accesses a WEBRTC signaling gateway device and a gateway identifier of the WEBRTC signaling gateway device accessed by the called terminal, where the access mode includes accessing via WEB;

a transmitting unit, configured to: transmit the access mode in which the called terminal accesses the WEBRTC signaling gateway device and the gateway identifier of the WEBRTC signaling gateway device accessed by the called terminal to the first WEBRTC signaling gateway device, where the access mode and the gateway identifier are determined by the determining unit, to enable the first WEBRTC signaling device to determine that the called terminal is a WEBRT terminal according to the access mode, transmit the session request message to the called terminal via the WEBRTC signaling gateway device corresponding to the gateway identifier, and transmit a received session response message to the calling terminal to enable the calling terminal to establish an end-to-end media channel between the calling terminal and the called terminal according to the session response message.

In a first possible implementation of the fourth aspect, the determining unit is specifically configured to: query a corresponding relation stored therein according to the identifier of the called terminal, and determine the access mode in which the called terminal accesses the WEBRTC signaling gateway device and the gateway identifier of the WEBRTC signaling gateway device accessed by the called terminal, where the corresponding relation includes a corresponding relation among the identifier of the called terminal, the gateway identifier of the WEBRTC signaling gateway device accessed by the called terminal and the access mode in which the called terminal accesses the WEBRTC signaling gateway device.

With reference to the fourth aspect or the first possible implementation, in a second possible implementation, the WEBRTC server also includes a storing unit; the receiving unit is further configured to: before receiving the query request message transmitted by the first WEBRTC signaling gateway device, receive an authentication message transmitted by the WEBRTC signaling gateway device accessed by the called terminal, where the authentication message includes an access code;

the storing unit is configured to: when it is determined that the access code received by the receiving unit is an access code assigned by the WEBRTC signaling gateway device accessed by the called terminal to the called terminal, store the corresponding relation among the identifier of the called terminal, the gateway identifier of the WEBRTC signaling gateway device accessed by the called terminal and the access mode in which the called terminal accesses the WEBRTC signaling gateway device.

With reference to the fourth aspect or the first possible implementation, in a third possible implementation, if the WEBRTC server accessed by the called terminal is another WEBRTC server, the receiving unit is further configured to: receive a corresponding relation among the identifier of the called terminal, the gateway identifier of the WEBRTC signaling gateway device accessed by the called terminal and the access mode in which the called terminal accesses the WEBRTC signaling gateway device, where the corresponding relation is transmitted by the another WEBRTC server;

where the corresponding relation is stored when the another WEBRTC server receives an authentication message including an access code and it is determined that the access code is an access code assigned by the WEBRTC signaling gateway device accessed by the called terminal to the called terminal, where the authentication message is transmitted by the WEBRTC signaling gateway device accessed by the called terminal.

With reference to any possible implementation in the first possible implementation to the third possible implementation, in a fourth possible implementation, the WEBRTC server also includes an updating unit, then the receiving unit is further configured to: after the called terminal is disconnected from the corresponding WEBRTC signaling gateway device, receive an update request message transmitted by the WEBRTC signaling gateway device corresponding to the called terminal;

the updating unit is configured to modify the access mode in which the called terminal accesses the WEBRTC signaling gateway device according to the update request message received by the receiving unit.

According to the above solutions, before establishing a media channel between a calling terminal and a called terminal, the calling terminal may predetermine whether the called terminal is a WEBRTC terminal, and establish an end-to-end media channel between the calling terminal and the called terminal when determining that the called terminal is the WEBRTC terminal, then data transmission between the calling terminal and the called terminal does not need to pass through a media gateway device to perform data format conversion and terminate an ICE process, thereby reducing path length of data transmission between two WEBRTC terminals, meanwhile reducing network delays, and reducing load of the media gateway device.

DESCRIPTION OF EMBODIMENTS

Technical solutions in embodiments of the present disclosure will be described hereunder clearly and completely with reference to accompanying drawings in the embodiments of the present disclosure. Obviously, the described embodiments are merely a part of embodiments of the present disclosure, rather than all embodiments of the present disclosure. All other embodiments obtained by persons of ordinary skill in the art based on the embodiments of the present disclosure without any creative effort shall fall into the protection scope of the present disclosure.

Figure 1:
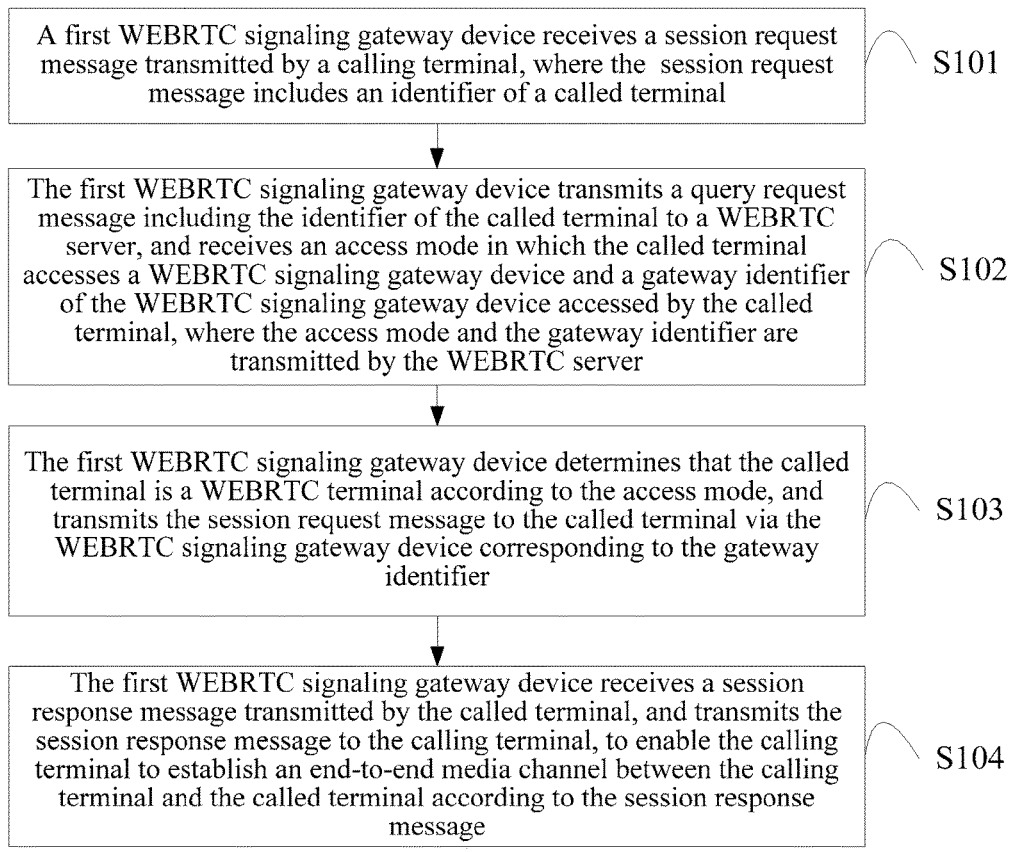
FIG. 1 is a schematic flow chart of a method for establishing a channel according to an embodiment of the present disclosure.

An embodiment of the present disclosure provides a method for establishing a channel, as shown in FIG. 1, the method includes:

S101, a first WEBRTC signaling gateway device receives a session request message transmitted by a calling terminal, where the session request message includes an identifier of a called terminal.

The calling terminal is a WEBRTC terminal.

Optionally, before the first WEBRTC signaling gateway device receives the session request message transmitted by the calling terminal, the calling terminal logs in a WEBRTC server corresponding to the calling terminal using a user name and a password, the WEBRTC server authenticates the user name and the password, and returns an access code and an IP address of the WEBRTC signaling gateway device to the calling terminal after the authentication succeeds. The WEBRTC server may assign the WEBRTC signaling gateway device to the calling terminal through load balancing and proximity principle, and the IP address of the WEBRTC signaling gateway device as returned by the WEBRTC server may be one, and may also be a list, the calling terminal selects a WEBRTC signaling gateway device to access according to a local policy, where the WEBRTC signaling gateway device that the calling terminal determines to access is the first WEBRTC signaling gateway device.

Furthermore, the calling terminal transmits an IMS register request message to the first WEBRTC signaling gateway device, where the register request message carries the access code, then after the first WEBRTC signaling gateway device receives the register request message, the first WEBRTC signaling gateway device makes an authentication in the WEBRTC server using the access code to determine that the calling terminal has passed the authentication of the WEBRTC server.

Specifically, the first WEBRTC signaling gateway device transmits an authentication message carrying the access code to the WEBRTC server to enable the WEBRTC server to determine whether the access code is assigned by the WEBRTC server to the calling terminal, if yes, then it is determined that the calling terminal authentication successes, then the WEBRTC server stores a corresponding relation among an identifier of the calling terminal, a gateway identifier of the first WEBRTC signaling gateway device and a WEB access mode in which the calling terminal accesses the first WEBRTC signaling gateway device, and transmits an IMPU (IP multimedia subsystem public identity) of the calling terminal and an IMPI (IP multimedia private identity) of the calling terminal to the first WEBRTC signaling gateway device, then the first WEBRTC signaling gateway device transmits the IMS register request message to an IMS signaling gateway device according to the IMPU and the IMPI, the IMS signaling gateway device returns an IMS register response message to the calling terminal, and completes registration of the calling terminal in an IMS network.

It should be noted that, the WEBRTC server may use a corresponding relation table to store the corresponding relation among the identifier of the calling terminal, the gateway identifier of the first WEBRTC signaling gateway device and the WEB access mode in which the calling terminal accesses the first WEBRTC signaling gateway device, where the corresponding relation table may include a corresponding relation table between the identifier of the calling terminal and the gateway identifier of the first WEBRTC signaling gateway device, and a corresponding relation table between the identifier of the calling terminal and the WEB access mode in which the calling terminal accesses the first WEBRTC signaling gateway device. For a specific storing method of the WEBRTC server, the present disclosure will not make a limitation.

Furthermore, after the registration is completed, the calling terminal transmits the session request message to the first WEBRTC signaling gateway device, where the session request message is used for establishing a media channel between the calling terminal and the called terminal.

S102, the first WEBRTC signaling gateway device transmits a query request message including the identifier of the called terminal to a WEBRTC server, and receives an access mode in which the called terminal accesses a WEBRTC signaling gateway device and a gateway identifier of the WEBRTC signaling gateway device accessed by the called terminal, where the access mode and the gateway identifier are transmitted by the WEBRTC server.

The access mode includes accessing via WEB.

It should be noted that, as described in step S101 specifically, after the calling terminal accesses the first WEBRTC signaling gateway device, the WEBRTC server will store the corresponding relation among the identifier of the calling terminal, the gateway identifier of the first WEBRTC signaling gateway device and the WEB access mode in which the calling terminal accesses the first WEBRTC signaling gateway device, likewise, after the called terminal accesses the WEBRTC signaling gateway device, the WEBRTC server corresponding to the called terminal stores the corresponding relation among the identifier of the called terminal, the gateway identifier of the WEBRTC signaling gateway device accessed by the called terminal and the access mode in which the called terminal accesses the WEBRTC signaling gateway device.

The calling terminal and the called terminal may be connected to a same WEBRTC server, then after receiving the query request message, the WEBRTC server queries a corresponding relation stored therein according to the identifier of the called terminal, determines an access mode in which the called terminal accesses the WEBRTC signaling gateway device and a gateway identifier of the WEBRTC signaling gateway device accessed by the called terminal, and transmits the access mode and the gateway identifier to the first WEBRTC signaling gateway device; if the calling terminal and the called terminal are connected to different WEBRTC servers of a same operator, since data query or data synchronization may be performed between WEBRTC servers of the same operator network, a WEBRTC server receiving the query request message may likewise determine an access mode in which the called terminal accesses the WEBRTC signaling gateway device and a gateway identifier of the WEBRTC signaling gateway device accessed by the called terminal according to the identifier of the called terminal, and transmit the access mode and the gateway identifier to the first WEBRTC signaling gateway device.

Optionally, WEBRTC servers connected to the calling terminal and the called terminal respectively may also belong to different operators. If the WEBRTC servers connected to the calling terminal and the called terminal respectively belong to different operators, then data synchronization or data query may also be performed between WEBRTC servers of different operators, thus, a WEBRTC server receiving the query request message may likewise determine an access mode in which the called terminal accesses the WEBRTC signaling gateway device and a gateway identifier of the WEBRTC signaling gateway device accessed by the called terminal according to the identifier of the called terminal, and transmit the access mode and the gateway identifier to the first WEBRTC signaling gateway device. Interconnection between WEBRTC signaling gateway devices of different operators may be realized using an interconnection border gateway function (IBGF).

S103, the first WEBRTC signaling gateway device determines that the called terminal is a WEBRTC terminal according to the access mode, and transmits the session request message to the called terminal via the WEBRTC signaling gateway device corresponding to the gateway identifier.

Specifically, since signaling protocols are different, access modes in which a WEBRTC terminal and an SIP terminal access the WEBRTC signaling gateway device respectively may also be different, the access mode in which the WEBRTC terminal accesses the WEBRTC signaling gateway device is a WEB access mode, and the access mode in which the SIP terminal accesses the WEBRTC signaling gateway device is an SIP access mode, thus, the first WEBRTC signaling gateway device can determine a terminal type of the called terminal through the access mode in which the called terminal accesses the WEBRTC signaling gateway device.

Furthermore, the first WEBRTC signaling gateway device determines that the WEBRTC signaling gateway device accessed by the called terminal is the first WEBRTC signaling gateway device according to the gateway identifier of the WEBRTC signaling gateway device accessed by the called terminal, that is, the calling terminal and the called terminal access the same WEBRTC signaling gateway device, then the first WEBRTC signaling gateway device transmits the session request message to the called terminal directly.

If the first WEBRTC signaling gateway device determines that the WEBRTC signaling gateway device accessed by the called terminal is a second WEBRTC signaling gateway device according to the gateway identifier of the WEBRTC signaling gateway device accessed by the called terminal, that is, the calling terminal and the called terminal access different WEBRTC signaling gateway devices, then the first WEBRTC signaling gateway device transmits the session request message to the second WEBRTC signaling gateway device, so as to enable the second WEBRTC signaling gateway device to transmit the session request message to the called terminal.

It should be noted that, when the first WEBRTC signaling gateway device determines that the called terminal is the WEBRTC terminal, there may be no need to go through a step in the prior art that a WEBRTC signaling gateway device applies for a media resource from a WEBRTC media gateway device, and there is no need to modify SDP description in the session request message when forwarding a session request message to the called terminal.

S104, the first WEBRTC signaling gateway device receives a session response message transmitted by the called terminal, and transmits the session response message to the calling terminal, to enable the calling terminal to establish an end-to-end media channel between the calling terminal and the called terminal according to the session response message.

Specifically, reference may be made to specific descriptions in step S103, if the calling terminal and the called terminal access the same WEBRTC signaling gateway device, then the first WEBRTC signaling gateway device directly receives a session response message transmitted by the called terminal; if the calling terminal and the called terminal access different WEBRTC signaling gateway devices, then the called terminal transmits a session response message to the second WEBRTC signaling gateway device, and the first WEBRTC signaling gateway device receives the session response message transmitted by the second WEBRTC signaling gateway device.

Optionally, the session request message includes media candidate address information of the calling terminal, where the session response message includes media candidate address information of the called terminal, then the calling terminal establishes the end-to-end media channel between the calling terminal and the called terminal according to the media candidate address information of its own and the media candidate address information of the called terminal.

It should be noted that, in the prior art, upon modification of the session request message, the session request message received by the called terminal includes media candidate address information of a media gateway device, and the media gateway device establishes the media channel between the media gateway device and the calling terminal and the media channel between the media gateway device and the called terminal, respectively. In embodiments of the present disclosure, since both the calling terminal and the called terminal are the WEBRTC terminals, the calling terminal and the called terminal may transmit data directly. In this embodiment, the session request message is not modified, then the calling terminal establishes an end-to-end media channel between the calling terminal and the called terminal according to media candidate address information of its own and media candidate address information of the called terminal, where the end-to-end media channel indicates that a media channel between the calling terminal and the called terminal does not pass through a media gateway device. Optionally, the end-to-end media channel indicates that a media channel between the calling terminal and the called terminal does not pass through an IMS media gateway device or a WEBRTC media gateway device.

Figure 2:
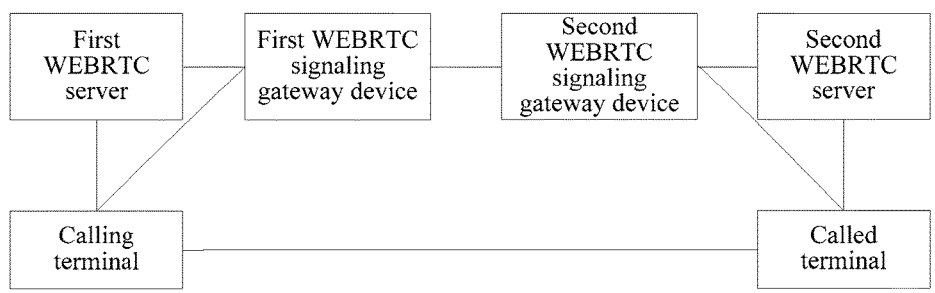
FIG. 2 is a schematic structural diagram of a system in which two WEBRTC terminals perform data transmission based on an IMS network according to an embodiment of the present disclosure.

As shown in FIG. 2, FIG. 2 is a schematic structural diagram of a system in which an embodiment of the present disclosure is applied in the data transmission performed between two WEBRTC terminals based on an IMS network, including: a first WEBRTC server, a first WEBRTC signaling gateway device, a second WEBRTC signaling gateway device and a second WEBRTC server, connected relation thereof is shown in the drawing.

WEBRTC servers connected to the calling terminal and the called terminal may be the same or may be different, that is, the first WEBRTC server and the second WEBRTC server in FIG. 2 may be the same WEBRTC server; WEBRTC signaling gateway devices accessed by the calling terminal and the called terminal may be the same or may be different, that is, the first WEBRTC signaling gateway device and the second WEBRTC signaling gateway device in FIG. 2 may also be the same WEBRTC signaling gateway device.

In the prior art, in a system in which two WEBRTC terminals transmit data to each other based on an IMS network, the system includes a WEBRTC server, a WEBRTC signaling gateway device, a WEBRTC media gateway device, an IMS signaling gateway device and an IMS media gateway device, then a media channel established between a calling terminal and a called terminal needs to pass through the WEBRTC media gateway device and the IMS media gateway device, where the WEBRTC media gateway device is used for converting an SRTP into an RTP, and the IMS media gateway device is used for converting the RTP into the SRTP. Signaling transmission between the calling terminal and the called terminal needs to pass through the IMS signaling gateway device, where the IMS signaling gateway device is used for converting a standard SIP signaling into a WEBRTC signaling.

With reference to FIG. 2, in the embodiment of the present disclosure, when predetermining that a called terminal is a WEBRTC terminal, the first WEBRTC signaling gateway device transmits a session request message to the called terminal via the second WEBRTC signaling gateway device, there is no need to modify an SDP in the session request message, and there is no need to pass through the IMS signaling gateway device. After receiving the session request message, the called terminal transmits a session response message to the calling terminal according to the unmodified SDP, then the calling terminal establishes an end-to-end media channel between the calling terminal and the called terminal according to the session response message, that is, the media channel does not pass through a media gateway device, thereby avoiding data format conversions performed by the media gateway devices (including the WEBRTC media gateway device and the IMS media gateway device) in the prior art.

Furthermore, if the first WEBRTC signaling gateway device does not acquire an access mode of the called terminal from the WEBRTC server in step S102, or the first WEBRTC signaling gateway device determines that the called terminal is not a WEBRTC terminal according to the access mode in Step S103, then according to of the procedure in the prior art, the first WEBRTC signaling gateway device needs to apply for a media resource from the first WEBRTC media gateway device, and modify SDP description in the session request message when forwarding the session request message, and finally establish the media channel between the calling terminal and the called terminal via the IMS media gateway device respectively.

According to the above method, before establishing a media channel between a calling terminal and a called terminal, the calling terminal may predetermine whether the called terminal is a WEBRTC terminal, and establish an end-to-end media channel between the calling terminal and the called terminal when determining that the called terminal is the WEBRTC terminal, then data transmission between the calling terminal and the called terminal does not need to pass through a media gateway device to perform data format conversion and terminate an ICE process, thereby reducing path length of data transmission between two WEBRTC terminals, meanwhile reducing network delays, and reducing load of the media gateway device.

Figure 3:
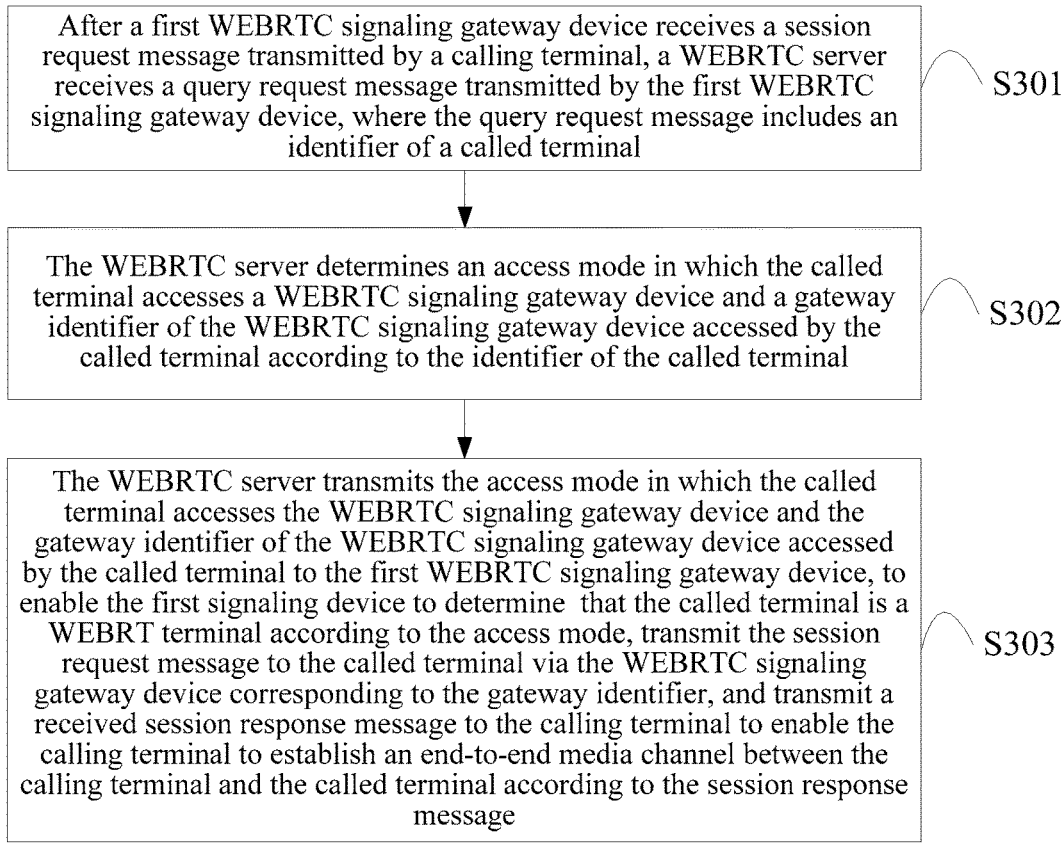
FIG. 3 is a schematic flow chart of another method for establishing a channel according to an embodiment of the present disclosure.

An embodiment of the present disclosure provides a method for establishing a channel, as shown in FIG. 3, the method includes:

S301, after a first WEBRTC signaling gateway device receives a session request message transmitted by a calling terminal, a WEBRTC server receives a query request message transmitted by the first WEBRTC signaling gateway device, where the query request message includes an identifier of a called terminal.

The calling terminal is a WEBRTC terminal.

Optionally, before the first WEBRTC signaling gateway device receives the session request message transmitted by the calling terminal, the calling terminal logs in the WEBRTC server using a user name and a password, the WEBRTC server authenticates the user name and the password, and returns an access code and an IP address of the WEBRTC signaling gateway device to the calling terminal after the authentication succeeds. The WEBRTC server may assign the WEBRTC signaling gateway device to the calling terminal through load balancing and proximity principle, and the IP address of the WEBRTC signaling gateway device as returned by the WEBRTC server may be one, and may also be a list, the calling terminal selects a WEBRTC signaling gateway device to access according to a local policy, and the WEBRTC signaling gateway device that the calling terminal determines to access is the first WEBRTC signaling gateway device.

Furthermore, the calling terminal transmits an IMS register request message to the first WEBRTC signaling gateway device, where the register request message carries the access code, then after the first WEBRTC signaling gateway device receives the register request message, the first WEBRTC signaling gateway device makes an authentication in the WEBRTC server using the access code, so as to determine that the calling terminal has passed the authentication of the WEBRTC server.

Specifically, the first WEBRTC signaling gateway device transmits an authentication message carrying the access code to the WEBRTC server, so as to enable the WEBRTC server to determine whether the access code is assigned by the WEBRTC server to the calling terminal, if yes, then it is determined that the calling terminal authentication successes, then the WEBRTC server stores a corresponding relation among an identifier of the calling terminal, a gateway identifier of the first WEBRTC signaling gateway device and a WEB access mode in which the calling terminal accesses the first WEBRTC signaling gateway device, and transmits an IMPU of the calling terminal and an IMPI of the calling terminal to the first WEBRTC signaling gateway device, then the first WEBRTC signaling gateway device transmits the IMS register request message to an IMS signaling gateway device according to the IMPU and the IMPI, the IMS signaling gateway device returns an IMS register response message to the calling terminal, and completes registration of the calling terminal in an IMS network.

It should be noted that, the WEBRTC server may use a corresponding relation table to store the corresponding relation among the identifier of the calling terminal, the gateway identifier of the first WEBRTC signaling gateway device and the WEB access mode in which the calling terminal accesses the first WEBRTC signaling gateway device, where the corresponding relation table may include a corresponding relation table between the identifier of the calling terminal and the gateway identifier of the first WEBRTC signaling gateway device, and a corresponding relation table between the identifier of the calling terminal and the WEB access mode in which the calling terminal accesses the first WEBRTC signaling gateway device. For a specific storing method of the WEBRTC server, the present disclosure will not make a limitation.

S302, the WEBRTC server determines an access mode in which the called terminal accesses a WEBRTC signaling gateway device and a gateway identifier of the WEBRTC signaling gateway device accessed by the called terminal according to the identifier of the called terminal.

The access mode includes an accessing via WEB.

It should be noted that, as described in step S301 specifically, after the calling terminal accesses the first WEBRTC signaling gateway device, the WEBRTC server will store the corresponding relation among the identifier of the calling terminal, the gateway identifier of the first WEBRTC signaling gateway device and the WEB access mode in which the calling terminal accesses the first WEBRTC signaling gateway device, likewise, after the called terminal accesses the WEBRTC signaling gateway device, the WEBRTC server corresponding to the called terminal stores the corresponding relation among the identifier of the called terminal, the gateway identifier of the WEBRTC signaling gateway device accessed by the called terminal and the access mode in which the called terminal accesses the WEBRTC signaling gateway device.

Optionally, the WEBRTC server queries a corresponding relation stored therein according to the identifier of the called terminal, and determines the access mode in which the called terminal accesses the WEBRTC signaling gateway device and the gateway identifier of the WEBRTC signaling gateway device accessed by the called terminal, where the corresponding relation includes a corresponding relation among the identifier of the called terminal, the gateway identifier of the WEBRTC signaling gateway device accessed by the called terminal and the access mode in which the called terminal accesses the WEBRTC signaling gateway device.

Specifically, if a WEBRTC server accessed by the called terminal is the WEBRTC server, that is, the calling terminal and the called terminal access the same WEBRTC server, then after the called terminal accesses the WEBRTC signaling gateway device, the WEBRTC server will also store the corresponding relation among the identifier of the called terminal, the gateway identifier of the WEBRTC signaling gateway device accessed by the called terminal and the access mode in which the called terminal accesses the WEBRTC signaling gateway device, then after receiving the query request message, the WEBRTC server may determine, from the corresponding relation stored therein according to the identifier of the called terminal, the access mode in which the called terminal accesses the WEBRTC signaling gateway device and the gateway identifier of the WEBRTC signaling gateway device accessed by the called terminal.

If the calling terminal and the called terminal are connected to different WEBRTC servers, data synchronization may be performed between WEBRTC servers of the same operator network, before receiving the query request message transmitted by the first WEBRTC signaling gateway device, the WEBRTC server receives the corresponding relation among the identifier of the called terminal, the gateway identifier of the WEBRTC signaling gateway device accessed by the called terminal and the access mode in which the called terminal accesses the WEBRTC signaling gateway device, where the corresponding relation is transmitted by another WEBRTC server (i.e., a WEBRTC server connected to the calling terminal), in this case, after receiving the query request message, the WEBRTC server may likewise determine, from the corresponding relation stored therein according to the identifier of the called terminal, the access mode in which the called terminal accesses the WEBRTC signaling gateway device and the gateway identifier of the WEBRTC signaling gateway device accessed by the called terminal.

Optionally, data query may be performed between WEBRTC servers of the same operator network, then after receiving the query request message, the WEBRTC server may query the gateway identifier of the WEBRTC signaling gateway device accessed by the called terminal and the access mode in which the called terminal accesses the WEBRTC signaling gateway device in another WEBRTC server according to the identifier of the called terminal.

Optionally, WEBRTC servers connected to the calling terminal and the called terminal respectively may also belong to different operators. If the WEBRTC servers connected to the calling terminal and the called terminal respectively belong to different operators, then data synchronization or data query may also be performed between WEBRTC servers of different operators. Thus, a WEBRTC server may likewise determine from the WEBRTC servers connected to the called terminal according to the identifier of the called terminal, the access mode in which the called terminal accesses the WEBRTC signaling gateway device and the gateway identifier of the WEBRTC signaling gateway device accessed by the called terminal. Interconnection between WEBRTC signaling gateway devices of different operators may be realized using an interconnection border gateway function.

Furthermore, after the called terminal device is disconnected from the corresponding WEBRTC signaling gateway device, the WEBRTC server receives an update request message transmitted by the WEBRTC signaling gateway device corresponding to the called terminal, and modifies the access mode in which the called terminal accesses the WEBRTC signaling gateway device according to the update request message.

S303, the WEBRTC server transmits the access mode in which the called terminal accesses the WEBRTC signaling gateway device and the gateway identifier of the WEBRTC signaling gateway device accessed by the called terminal to the first WEBRTC signaling gateway device, to enable the first WEBRTC signaling device to determine that the called terminal is a WEBRT terminal according to the access mode, transmit the session request message to the called terminal via the WEBRTC signaling gateway device corresponding to the gateway identifier, and transmit a received session response message to the calling terminal to enable the calling terminal to establish an end-to-end media channel between the calling terminal and the called terminal according to the session response message.

Since signaling protocols are different, access modes in which a WEBRTC terminal and an SIP terminal access the WEBRTC signaling gateway device respectively may also be different, the access mode in which the WEBRTC terminal accesses the WEBRTC signaling gateway device is a WEB access mode, and the access mode in which the SIP terminal accesses the WEBRTC signaling gateway device is an SIP access mode, thus, the first WEBRTC signaling gateway device can determine a terminal type of the called terminal through the access mode in which the called terminal accesses the WEBRTC signaling gateway device.

It should be noted that, in the prior art, through modification of the session request message, the session request message received by the called terminal includes media candidate address information of a media gateway device, and the media gateway device establishes the media channel between the media gateway device and the calling terminal and the media channel between the media gateway device and the called terminal, respectively. In the embodiment of the present disclosure, when the first WEBRTC signaling gateway device determines that the called terminal is a WEBRTC terminal, there is no need to go through the step in the prior art that the WEBRTC signaling gateway device applies the media resource for the WEBRTC media gateway device, and there is no need to modify SDP description in the session request message when forwarding a session request message to the called terminal, thus, the calling terminal establishes a media channel which does not pass through the media gateway device according to media candidate address information of terminals at both ends.

According to the above method, before establishing a media channel between a calling terminal and a called terminal, the calling terminal may predetermine whether the called terminal is a WEBRTC terminal, and establish a media channel between the calling terminal and the called terminal which does not pass through a media gateway device when it is determined that the called terminal is the WEBRTC terminal, then data transmission between the calling terminal and the called terminal does not need to pass through a media gateway device to perform data format conversion and terminate an ICE process, thereby reducing path length of data transmission between two WEBRTC terminals, meanwhile reducing network delays, and reducing load of the media gateway device.

Figure 4:
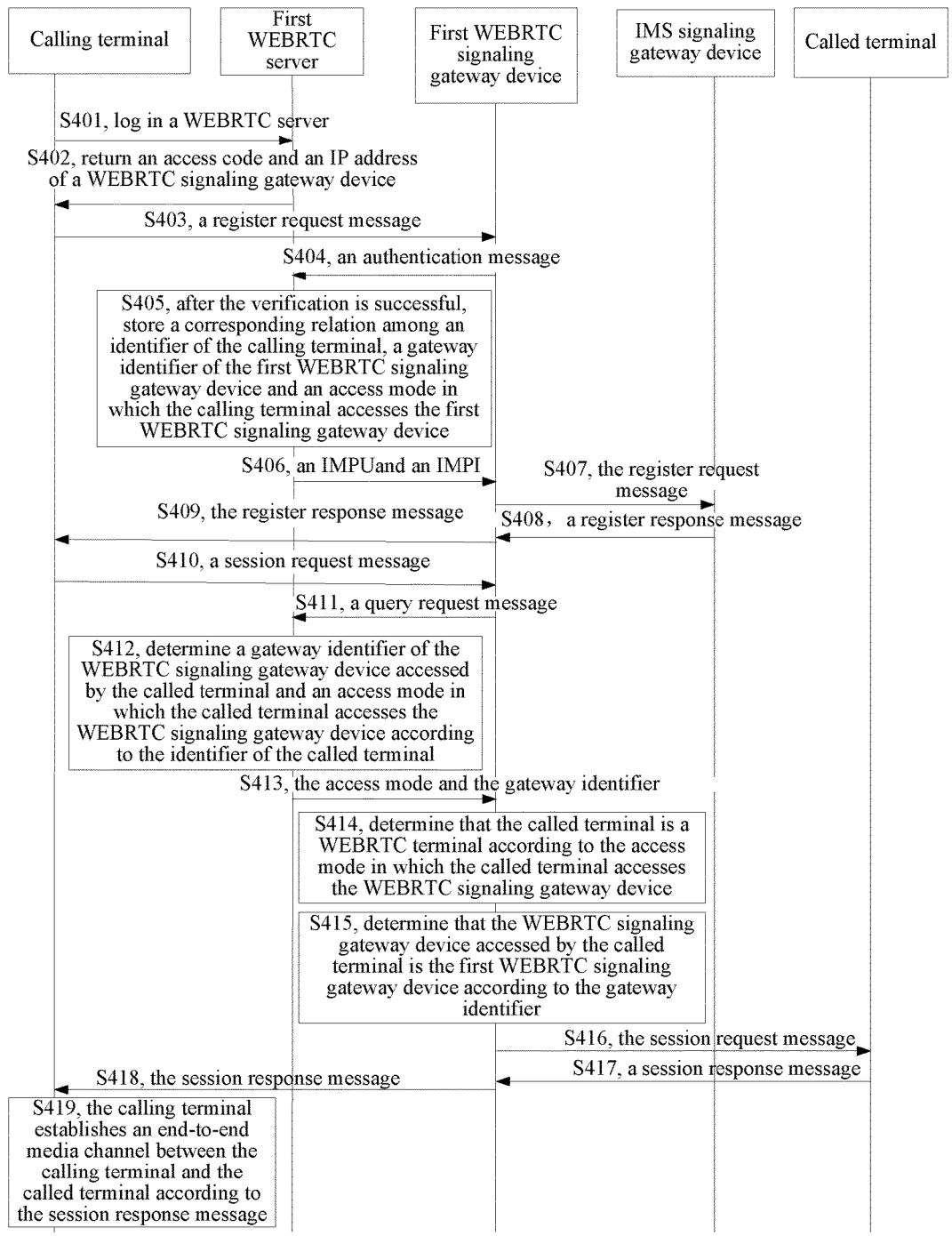
FIG. 4 is a schematic flow chart of another method for establishing a channel according to an embodiment of the present disclosure.

In order to enable persons skilled in the art to understand technical solutions provided in embodiments of the present disclosure more clearly, another data transmission method according to an embodiment of the present disclosure will be described in detail with reference to specific embodiments, as shown in FIG. 4, the method is described by taking an example where both a calling terminal and a called terminal are WEBRTC terminals, including:

S401, a calling terminal logs in a WEBRTC server, and downloads WEBRTC related code logic from the WEBRTC server.

Specifically, the calling terminal logs in a WEBRTC server using a user name and a password, the WEBRTC server authenticates the user name and the password, and the calling terminal downloads WEBRTC related code logic such as JS (Java script) from the WEBRTC server after the authentication successes, so that the calling terminal initiates a registration and a session request message to a WEBRTC signaling gateway device through executing the JS logic.

S402, the WEBRTC server returns an access code and an IP address of a first WEBRTC signaling gateway device to the calling terminal.

The WEBRTC server may assign the WEBRTC signaling gateway device to the calling terminal through load balancing and proximity principle, and the IP address of the WEBRTC signaling gateway device as returned by the WEBRTC server may be one, and may also be a list, the calling terminal selects a WEBRTC signaling gateway device to access according to a local policy, where the WEBRTC signaling gateway device that the calling terminal determines to access is the first WEBRTC signaling gateway device.

S403, the calling terminal transmits a register request message to the first WEBRTC signaling gateway device according to the IP address of the first WEBRTC signaling gateway device.

The register request message carries the access code.

S404, the first WEBRTC signaling gateway device transmits an authentication message to the WEBRTC server.

The authentication message carries the access code.

S405, when determining that the access code is an access code assigned by the WEBRTC server to the calling terminal, the WEBRTC server stores a corresponding relation among an identifier of the calling terminal, a gateway identifier of the first WEBRTC signaling gateway device and an access mode in which the calling terminal accesses the first WEBRTC signaling gateway device.

S406, the WEBRTC server transmits an IMPU of the calling terminal and an IMPI of the calling terminal to the first WEBRTC signaling gateway device.

S407, the first WEBRTC signaling gateway device transmits the register request message to an IMS signaling gateway device according to the IMPU and the IMPI.

S408, the IMS signaling gateway device transmits a register response message to the first WEBRTC signaling gateway device.

S409, the first WEBRTC signaling gateway device transmits the register response message to the calling terminal.

It should be noted that, step S401 to step S409 are the procedure that the calling terminal registers an IMS network, and the calling terminal establishes a media channel between the calling terminal and the called terminal via the IMS network through performing step S410 to step S419.

S410, the calling terminal transmits a session request message to the first WEBRTC signaling gateway device.

The session request message includes an identifier of a called terminal.

S411, the first WEBRTC signaling gateway device transmits a query request message to the WEBRTC server.

The query request message includes the identifier of the called terminal.

S412, the WEBRTC server determines an identifier of the WEBRTC signaling gateway device accessed by the called terminal and an access mode in which the called terminal accesses the WEBRTC signaling gateway device according to the identifier of the called terminal.

It should be noted that, with reference to descriptions of step S405, after the calling terminal accesses the first WEBRTC signaling gateway device, the WEBRTC server will store the corresponding relation among the identifier of the calling terminal, the gateway identifier of the first WEBRTC signaling gateway device and the WEB access mode in which the calling terminal accesses the first WEBRTC signaling gateway device, likewise, after the called terminal accesses the WEBRTC signaling gateway device, the WEBRTC server corresponding to the called terminal stores a corresponding relation among an identifier of the called terminal, a gateway identifier of the WEBRTC signaling gateway device accessed by the called terminal and an access mode in which the called terminal accesses the WEBRTC signaling gateway device.

The calling terminal and the called terminal may be connected to the same WEBRTC server, then after the called terminal accesses the WEBRTC signaling gateway device, the WEBRTC server will also store the corresponding relation among the identifier of the called terminal, the gateway identifier of the WEBRTC signaling gateway device accessed by the called terminal and the access mode in which the called terminal accesses the WEBRTC signaling gateway device, then after receiving the query request message, the WEBRTC server may determine, from the corresponding relation stored therein according to the identifier of the called terminal, the access mode in which the called terminal accesses the WEBRTC signaling gateway device and the gateway identifier of the WEBRTC signaling gateway device accessed by the called terminal.

If the calling terminal and the called terminal are connected to different WEBRTC servers, since data synchronization may be performed between WEBRTC servers of the same operator network, before receiving the query request message transmitted by the first WEBRTC signaling gateway device, a WEBRTC server receives the corresponding relation among the identifier of the called terminal, the gateway identifier of the WEBRTC signaling gateway device accessed by the called terminal and the access mode in which the called terminal accesses the WEBRTC signaling gateway device, where the corresponding relation is transmitted by the WEBRTC server connected to the called terminal, in this case, after receiving the query request message, the WEBRTC server may likewise determine, from the corresponding relation stored therein according to the identifier of the called terminal, the access mode in which the called terminal accesses the WEBRTC signaling gateway device and the gateway identifier of the WEBRTC signaling gateway device accessed by the called terminal.

Optionally, data query may be performed between WEBRTC servers of the same operator network, then after receiving the query request message, the WEBRTC server may query the gateway identifier of the WEBRTC signaling gateway device accessed by the called terminal and the access mode in which the called terminal accesses the WEBRTC signaling gateway device in another WEBRTC server according to the identifier of the called terminal.

Optionally, WEBRTC servers connected to the calling terminal and the called terminal respectively may also belong to different operators. If the WEBRTC servers connected to the calling terminal and the called terminal respectively belong to different operators, then data synchronization or data query may also be performed between WEBRTC servers of different operators. Thus, a WEBRTC server may likewise determine from the WEBRTC servers connected to the called terminal according to the identifier of the called terminal, the access mode in which the called terminal accesses the WEBRTC signaling gateway device and the gateway identifier of the WEBRTC signaling gateway device accessed by the called terminal. Interconnection between WEBRTC signaling gateway devices of different operators may be realized using an interconnection border gateway function IBGF.

S413, the WEBRTC server transmits the gateway identifier of the WEBRTC signaling gateway device accessed by the called terminal and the access mode in which the called terminal accesses the WEBRTC signaling gateway device to the first WEBRTC signaling gateway device.

S414, the first WEBRTC signaling gateway device determines that the called terminal is a WEBRTC terminal according to the access mode in which the called terminal accesses the WEBRTC signaling gateway device.

S415, the first WEBRTC signaling gateway device determines that the WEBRTC signaling gateway device accessed by the called terminal is the first WEBRTC signaling gateway device according to the gateway identifier.

S416, the first WEBRTC signaling gateway device transmits the session request message to the called terminal.

S417, the first WEBRTC signaling gateway device receives a session response message transmitted by the called terminal.

S418, the first WEBRTC signaling gateway device transmits the session response message to the calling terminal.

S419, the calling terminal establishes an end-to-end media channel between the calling terminal and the called terminal according to the session response message.

The session request message includes media candidate address information of the calling terminal, and the session response message includes media candidate address information of the called terminal, then the calling terminal establishes an end-to-end media channel between the calling terminal and the called terminal according to the media candidate address information of its own and the media candidate address information of the called terminal. The end-to-end media channel indicates that a media channel between the calling terminal and the called terminal does not pass through a media gateway device. The media gateway device includes an IMS media gateway device, or a WEBRTC media gateway device.

In the embodiment of the present disclosure, when predetermining that the called terminal is a WEBRTC terminal, the first WEBRTC signaling gateway device transmits a session request message to the called terminal directly, there is no need to modify an SDP in the session request message, that is, there is no need to pass through an IMS signaling gateway device. The called terminal transmits a session response message to the calling terminal according to the unmodified SDP after receiving the session request message, then the calling terminal establishes an end-to-end media channel between the calling terminal and the called terminal according to the session response message, that is, the media channel does not pass through a media gateway device, thereby avoiding data format conversions performed by the media gateway devices (including the WEBRTC media gateway device and the IMS media gateway device) in the prior art, reducing path length of data transmission between two WEBRTC terminals, meanwhile reducing network delays, and reducing load of the media gateway device.

Moreover, in order to describe the forgoing method embodiments in a simple way, the embodiments are expressed as a series of action combinations; however, persons skilled in the art should know that the present disclosure is not limited to the described action sequence, persons skilled in the art should also know that the embodiments described in the specification are preferred embodiments, and the involved actions and modules are not indispensable parts of the present disclosure.

Figure 5:
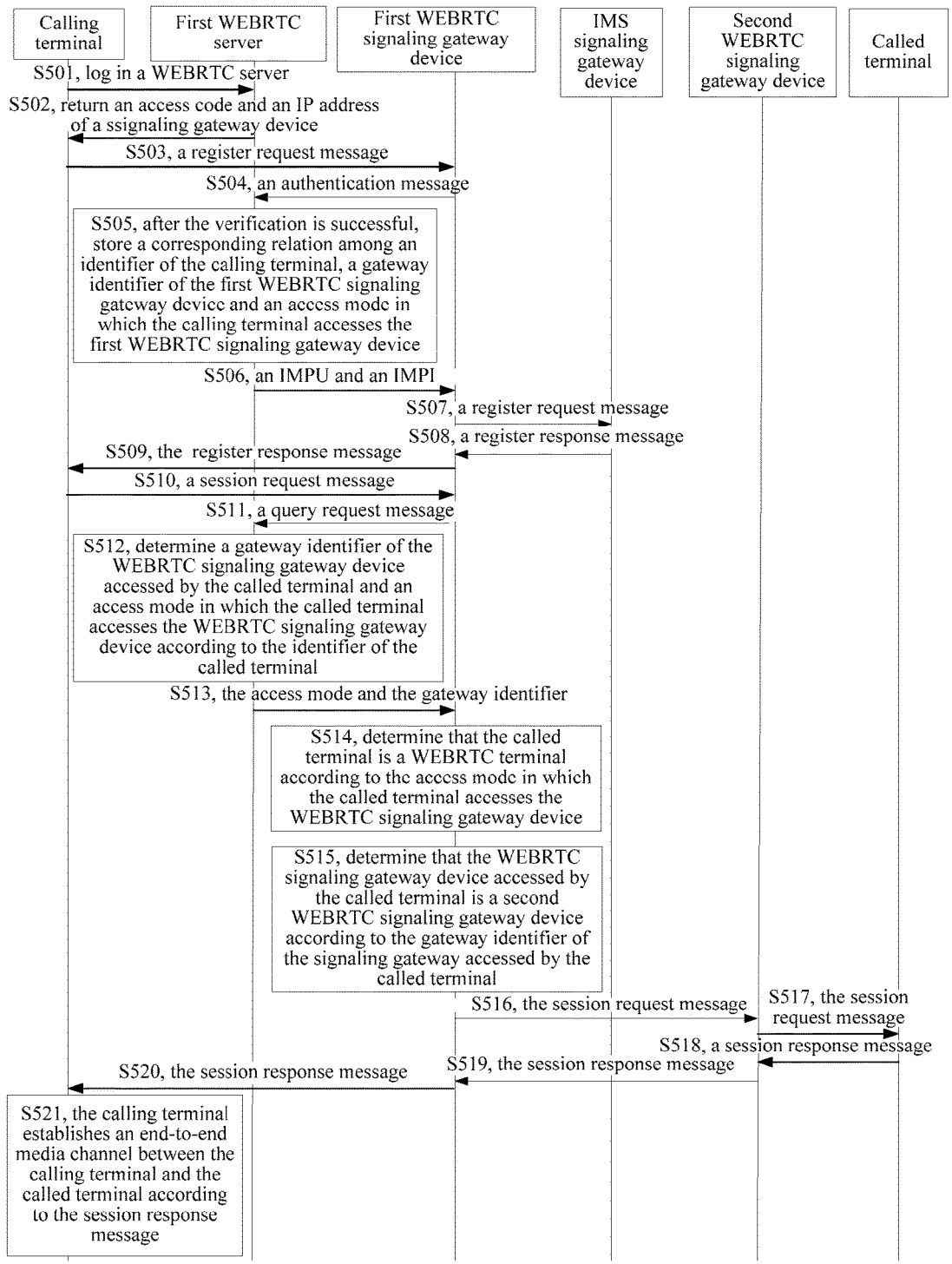
FIG. 5 is a schematic flow chart of another method for establishing a channel according to an embodiment of the present disclosure.

In order to enable persons skilled in the art to understand technical solutions provided in embodiments of the present disclosure more clearly, another data transmission method according to an embodiment of the present disclosure will be described in detail with reference to specific embodiments, as shown in FIG. 5, the method includes:

Step S501 to step S514 in the embodiment of the present disclosure are the same as step S401 to step S414 in the previous embodiment respectively, thus reference may be made to the foregoing step S401 to step S414 for specific descriptions.

S515, the first WEBRTC signaling gateway device determines that the WEBRTC signaling gateway device accessed by the called terminal is a second WEBRTC signaling gateway device according to the gateway identifier.

S516, the first WEBRTC signaling gateway device transmits the session request message to the second WEBRTC signaling gateway device.

S517, the second WEBRTC signaling gateway device transmits the session request message to the called terminal.

S518, the second WEBRTC signaling gateway device receives a session response message transmitted by the called terminal.

S519, the second WEBRTC signaling gateway device transmits the session response message to the first WEBRTC signaling gateway device.

S520, the first WEBRTC signaling gateway device transmits the session response message to the calling terminal.

S521, the calling terminal establishes an end-to-end media channel between the calling terminal and the called terminal according to the session response message.

Optionally, the session request message includes media candidate address information of the calling terminal, and the session response message includes media candidate address information of the called terminal, then the calling terminal establishes an end-to-end media channel between the calling terminal and the called terminal according to the media candidate address information of its own and the media candidate address information of the called terminal.

In this embodiment, the session request message is not modified, then the calling terminal establishes an end-to-end media channel between the calling terminal and the called terminal according to the media candidate address information of its own and the media candidate address information of the called terminal, where the end-to-end media channel indicates that a media channel between the calling terminal and the called terminal does not pass through a media gateway device. The media gateway device includes an IMS media gateway device, or a WEBRTC media gateway device.

In the embodiment of the present disclosure, when predetermining that the called terminal is a WEBRTC terminal, the first WEBRTC signaling gateway device transmits a session request message to the called terminal directly, there is no need to modify an SDP in the session request message, that is, there is no need to pass through an IMS signaling gateway device. The called terminal transmits a session response message to the calling terminal according to the unmodified SDP after receiving the session request message, then the calling terminal establishes an end-to-end media channel between the calling terminal and the called terminal according to the session response message, that is, the media channel does not pass through a media gateway device, thereby avoiding data format conversions performed by the media gateway devices (including the WEBRTC media gateway device and the IMS media gateway device) in the prior art, reducing path length of data transmission between two WEBRTC terminals, meanwhile reducing network delays, and reducing load of the media gateway device.

Moreover, in order to describe the forgoing method embodiments in a simple way, the embodiments are expressed as a series of action combinations; however, persons skilled in the art should know that the present disclosure is not limited to the described action sequence, persons skilled in the art should also know that the embodiments described in the specification are preferred embodiments, and the involved actions and modules are not indispensable parts of the present disclosure.

Figure 6:
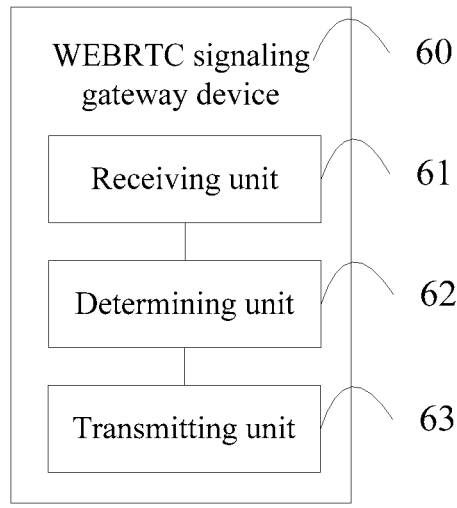
FIG. 6 is a schematic structural diagram of a WEBRTC signaling gateway device according to an embodiment of the present disclosure.

An embodiment of the present disclosure provides a WEBRTC signaling gateway device 60, as shown in FIG. 6, the WEBRTC signaling gateway device 60 includes:

A receiving unit 61, configured to: receive a session request message transmitted by a calling terminal and a session response message transmitted by a called terminal, where the session request message includes an identifier of the called terminal; and further configured to: receive an access mode in which the called terminal accesses a WEBRTC signaling gateway device and a gateway identifier of the WEBRTC signaling gateway device accessed by the called terminal, where the access mode and the gateway identifier are transmitted by a WEBRTC server after a query request message transmitted by the WEBRTC signaling gateway device is received, and where the query request message includes the identifier of the called terminal.

The calling terminal is a WEBRTC terminal, and the access mode includes accessing via WEB.

A determining unit 62, configured to determine that the called terminal is a WEBRTC terminal according to the access mode received by the receiving unit 61.

A transmitting unit 63, configured to: transmit the query request message including the identifier of the called terminal to the WEBRTC server; after the determining unit 62 determines that the called terminal is the WEBRTC terminal, transmit the session request message to the called terminal via the WEBRTC signaling gateway device corresponding to the gateway identifier; and transmit the session response message to the calling terminal, so as to enable the calling terminal to establish an end-to-end media channel between the calling terminal and the called terminal according to the session response message.

Optionally, the transmitting the session request message to the called terminal via the WEBRTC signaling gateway device corresponding to the gateway identifier specifically includes: determining that the WEBRTC signaling gateway device accessed by the called terminal is the first WEBRTC signaling gateway device according to the gateway identifier, and transmitting the session request message to the called terminal.

Optionally, the transmitting the session request message to the called terminal via the WEBRTC signaling gateway device corresponding to the gateway identifier includes: determining that the WEBRTC signaling gateway device accessed by the called terminal is a second WEBRTC signaling gateway device according to the gateway identifier, and transmitting the session request message to the second WEBRTC signaling gateway device to enable the second WEBRTC signaling gateway device to transmit the session request message to the called terminal; correspondingly, the receiving the session response message transmitted by the called terminal specifically includes: after the called terminal transmits the session response message to the second WEBRTC signaling gateway device, receiving the session response message transmitted by the second WEBRTC signaling gateway device.

Specifically, when determining that the WEBRTC signaling gateway device accessed by the called terminal is the WEBRTC signaling gateway device according to the gateway identifier, that is, the calling terminal and the called terminal access the same WEBRTC signaling gateway device, then the WEBRTC signaling gateway device transmits the session request message to the called terminal directly; when determining that the WEBRTC signaling gateway device accessed by the called terminal is a second WEBRTC signaling gateway device according to the identifier of the WEBRTC signaling gateway device accessed by the called terminal, that is, the calling terminal and the called terminal access different WEBRTC signaling gateway devices, then the WEBRTC signaling gateway device transmits the session request message to the second WEBRTC signaling gateway device, so as to enable the second WEBRTC signaling gateway device to transmit the session request message to the called terminal.

Optionally, the session request message includes media candidate address information of the calling terminal, the session response message includes media candidate address information of the called terminal, correspondingly, the establishing, by the calling terminal, the end-to-end media channel between the calling terminal and the called terminal according to the session response message specifically includes: the calling terminal establishes the end-to-end media channel between the calling terminal and the called terminal according to the media candidate address information of its own and the media candidate address information of the called terminal.

In the prior art, through modification of the session request message, the session request message received by the called terminal includes media candidate address information of a media gateway device, and the media gateway device establishes the media channel between the media gateway device and the calling terminal and the media channel between the media gateway device and the called terminal, respectively. In embodiments of the present disclosure, the session request message is not modified, then the calling terminal establishes an end-to-end media channel between the calling terminal and the called terminal according to media candidate address information of its own and media candidate address information of the called terminal, where the end-to-end media channel indicates that a media channel between the calling terminal and the called terminal does not pass through a media gateway device. The media gateway device includes an IMS media gateway device, or a WEBRTC media gateway device.

Persons skilled in the art may clearly know that, for the purpose of convenient and brief description, the foregoing functional modules are described merely by taking division thereof as an example, during practical use, the foregoing functions may be assigned to different functional modules according to a need, that is, an internal structure of an apparatus is divided into different functional modules to complete all or a part of the described functions. For a specific working process and descriptions of the described WEBRTC signaling gateway device, reference may be made to a corresponding process in the foregoing method embodiments, which will not be repeated herein.

According to the above WEBRTC signaling gateway device, before establishing a media channel between a calling terminal and a called terminal, the calling terminal may determine whether the called terminal is a WEBRTC terminal, and establish a media channel between the calling terminal and the called terminal which does not pass through a media gateway device when it is determined that the called terminal is the WEBRTC terminal, then data transmission between the calling terminal and the called terminal does not need to pass through a media gateway device to perform data format conversion and terminate an ICE process, thereby reducing path length of data transmission between two WEBRTC terminals, meanwhile reducing network delays, and reducing load of the media gateway device.

Figure 7:
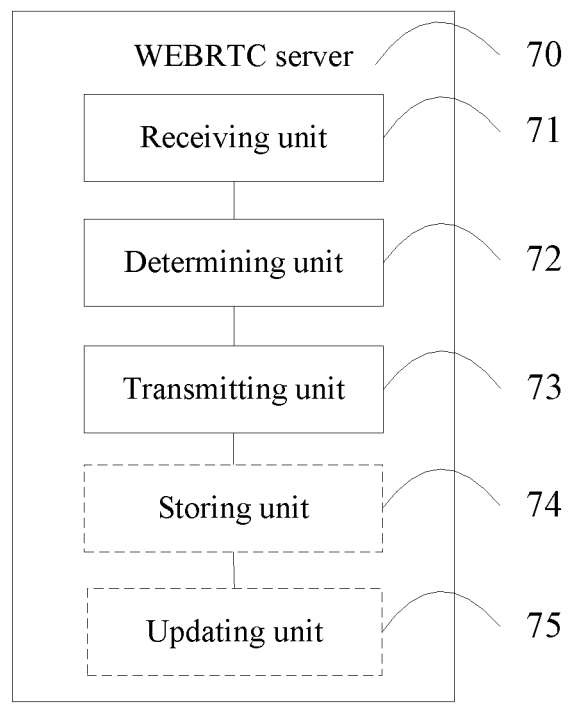
FIG. 7 is a schematic structural diagram of a WEBRTC server according to an embodiment of the present disclosure.

An embodiment of the present disclosure provides a WEBRTC server 70, as shown in FIG. 7, the WEBRTC server 70 includes:

A receiving unit 71, configured to: after a first WEBRTC signaling gateway device receives a session request message transmitted by a calling terminal, receive a query request message transmitted by the first WEBRTC signaling gateway device, where the query request message includes an identifier of a called terminal.

The calling terminal is a WEBRTC terminal.

A determining unit 72, configured to determine an access mode in which the called terminal accesses a WEBRTC signaling gateway device and a gateway identifier of the WEBRTC signaling gateway device accessed by the called terminal according to the identifier of the called terminal as received by the receiving unit 71.

The access mode includes accessing via WEB.

A transmitting unit 73, configured to: transmit the access mode in which the called terminal accesses the WEBRTC signaling gateway device and the gateway identifier of the WEBRTC signaling gateway device accessed by the called terminal to the first WEBRTC signaling gateway device, where the access mode and the gateway identifier are determined by the determining unit 72, so as to enable the first WEBRTC signaling device to determine that the called terminal is a WEBRT terminal according to the access mode, transmit the session request message to the called terminal via the WEBRTC signaling gateway device corresponding to the gateway identifier, and transmit a received session response message to the calling terminal to enable the calling terminal to establish an end-to-end media channel between the calling terminal and the called terminal according to the session response message.

Optionally, the determining unit 72 is specifically configured to: query a corresponding relation stored therein according to the identifier of the called terminal, and determine the access mode in which the called terminal accesses the WEBRTC signaling gateway device and the gateway identifier of the WEBRTC signaling gateway device accessed by the called terminal, where the corresponding relation includes a corresponding relation among the identifier of the called terminal, the gateway identifier of the WEBRTC signaling gateway device accessed by the called terminal and the access mode in which the called terminal accesses the WEBRTC signaling gateway device.

Optionally, the WEBRTC server also includes a storing unit 74; the receiving unit 71 is further configured to: before receiving the query request message transmitted by the first WEBRTC signaling gateway device, receive an authentication message transmitted by the WEBRTC signaling gateway device accessed by the called terminal, where the authentication message includes an access code; the storing unit 74 is configured to: when it is determined that the access code received by the receiving unit is an access code assigned by the WEBRTC signaling gateway device accessed by the called terminal to the called terminal, store the corresponding relation among the identifier of the called terminal, the gateway identifier of the WEBRTC signaling gateway device accessed by the called terminal and the access mode in which the called terminal accesses the WEBRTC signaling gateway device.

Optionally, if the WEBRTC server accessed by the called terminal is another WEBRTC server, the receiving unit 71 is further configured to: receive a corresponding relation among the identifier of the called terminal, the gateway identifier of the WEBRTC signaling gateway device accessed by the called terminal and the access mode in which the called terminal accesses the WEBRTC signaling gateway device, where the corresponding relation is transmitted by the further WEBRTC server.

The corresponding relation is stored when the another WEBRTC server receives an authentication message including an access code and it is determined that the access code is an access code assigned by the WEBRTC signaling gateway device accessed by the called terminal to the called terminal, where the authentication message is transmitted by the WEBRTC signaling gateway device accessed by the called terminal.

Specifically, if a WEBRTC server accessed by the called terminal is the WEBRTC server, that is, the calling terminal and the called terminal access the same WEBRTC server, then after the called terminal accesses the WEBRTC signaling gateway device, the WEBRTC server will also store the corresponding relation among the identifier of the called terminal, the gateway identifier of the WEBRTC signaling gateway device accessed by the called terminal and the access mode in which the called terminal accesses the WEBRTC signaling gateway device, then after receiving the query request message, the WEBRTC server may determine, from the corresponding relation stored therein according to the identifier of the called terminal, the access mode in which the called terminal accesses the WEBRTC signaling gateway device and the gateway identifier of the WEBRTC signaling gateway device accessed by the called terminal.

If the calling terminal and the called terminal are connected to different WEBRTC servers, data synchronization may be performed between WEBRTC servers of the same operator network, before receiving the query request message transmitted by the first WEBRTC signaling gateway device, the WEBRTC server receives the corresponding relation among the identifier of the called terminal, the gateway identifier of the WEBRTC signaling gateway device accessed by the called terminal and the access mode in which the called terminal accesses the WEBRTC signaling gateway device, where the corresponding relation is transmitted by a WEBRTC server connected to the called terminal, in this case, after receiving the query request message, the WEBRTC server may likewise determine, from the corresponding relation stored therein according to the identifier of the called terminal, the access mode in which the called terminal accesses the WEBRTC signaling gateway device and the gateway identifier of the WEBRTC signaling gateway device accessed by the called terminal.

Data query may be performed between WEBRTC servers of the same operator network, then after receiving the query request message, the WEBRTC server may query the gateway identifier of the WEBRTC signaling gateway device accessed by the called terminal and the access mode in which the called terminal accesses the WEBRTC signaling gateway device in another WEBRTC server according to the identifier of the called terminal.

WEBRTC servers connected to the calling terminal and the called terminal respectively may also belong to different operators. If the WEBRTC servers connected to the calling terminal and the called terminal respectively belong to different operators, then data synchronization or data query may also be performed between WEBRTC servers of different operators. Thus, a WEBRTC server may likewise determine from the WEBRTC servers connected to the called terminal according to the identifier of the called terminal, the access mode in which the called terminal accesses the WEBRTC signaling gateway device and the gateway identifier of the WEBRTC signaling gateway device accessed by the called terminal. Interconnection between WEBRTC signaling gateway devices of different operators may be realized using an interconnection border gateway function.

Optionally, the WEBRTC server also includes an updating unit 75, then the receiving unit 71 is further configured to: after the called terminal is disconnected from the corresponding WEBRTC signaling gateway device, receive an update request message transmitted by the WEBRTC signaling gateway device corresponding to the called terminal; the updating unit 75 is configured to modify the access mode in which the called terminal accesses the WEBRTC signaling gateway device according to the update request message received by the receiving unit.

In the prior art, through modification of the session request message, the session request message received by the called terminal includes media candidate address information of a media gateway device, and the media gateway device establishes the media channel between the media gateway device and the calling terminal and the media channel between the media gateway device and the called terminal, respectively. In embodiments of the present disclosure, the session request message is not modified, then the calling terminal establishes an end-to-end media channel between the calling terminal and the called terminal according to media candidate address information of its own and media candidate address information of the called terminal, where the end-to-end media channel indicates that a media channel between the calling terminal and the called terminal does not pass through a media gateway device. The media gateway device includes an IMS media gateway device, or a WEBRTC media gateway device.

Persons skilled in the art may clearly know that, for the purpose of convenient and brief description, the foregoing functional modules are described merely by taking division thereof as an example, during practical use, the foregoing functions may be assigned to different functional modules according to a need, that is, an internal structure of an apparatus is divided into different functional modules to complete all or a part of the described functions. For a specific working process and descriptions of the described WEBRTC server, reference may be made to a corresponding process in the foregoing method embodiments, which will not be repeated herein.

According to the above WEBRTC server, before establishing a media channel between a calling terminal and a called terminal, a WEBRTC terminal serving as the calling terminal may predetermine whether the called terminal is a WEBRTC terminal, and establish a media channel between the calling terminal and the called terminal which does not pass through a media gateway device when it is determined that the called terminal is the WEBRTC terminal, then data transmission between the calling terminal and the called terminal does not need to pass through a media gateway device to perform data format conversion and terminate an ICE process, thereby reducing path length of data transmission between two WEBRTC terminals, meanwhile reducing network delays, and reducing load of the media gateway device.

Figure 8:
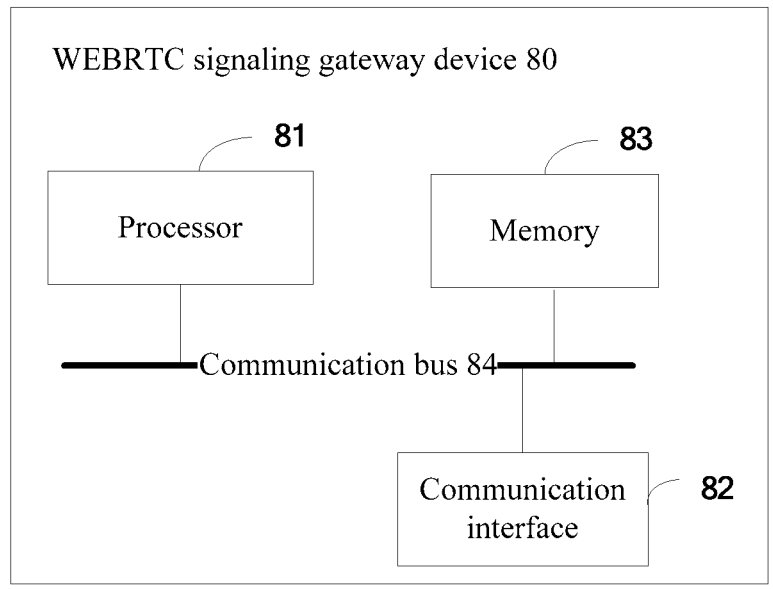
FIG. 8 is a schematic structural diagram of another WEBRTC signaling gateway device according to an embodiment of the present disclosure.

An embodiment of the present disclosure provides another WEBRTC signaling gateway device 80, as shown in FIG. 8, the WEBRTC signaling gateway device 80 includes:

A processor 81, a communication interface 82, a memory 83 and a communication bus 84, where the processor 81, the communication interface 82 and the memory 83 complete communications therebetween via the communication bus 84.

The processor 81 may be a multi-core central processing unit CPU, or an application specific integrated circuit ASIC, or one or more integrated circuits configured to implement embodiments of the present disclosure.

The memory 83 is configured to store program code, where the program code includes computer instruction and a network flow graph. The memory 83 may include a high-speed RAM memory, and may also include a non-volatile memory, such as at least one disk memory. The memory 83 may also be a memory array. The memory 83 may also be divided into blocks, and the blocks may be combined into a virtual volume according to a certain rule.

The communication interface 82 is configured to implement connections and communications between these apparatus.

The processor 81 is configured to execute program codes in the memory 83 so as to perform the following operations:

receiving a session request message transmitted by a calling terminal, where the session request message includes an identifier of a called terminal, and where the calling terminal is a WEBRTC terminal;

transmitting a query request message including the identifier of the called terminal to a WEBRTC server, and receiving an access mode in which the called terminal accesses a WEBRTC signaling gateway device and a gateway identifier of the WEBRTC signaling gateway device accessed by the called terminal, where the access mode and the gateway identifier are transmitted by the WEBRTC server, and where the access mode includes accessing via WEB;

determining that the called terminal is a WEBRTC terminal according to the access mode, and transmitting the session request message to the called terminal via the WEBRTC signaling gateway device corresponding to the gateway identifier; and receiving a session response message transmitted by the called terminal, and transmitting the session response message to the calling terminal, so as to enable the calling terminal to establish an end-to-end media channel between the calling terminal and the called terminal according to the session response message.

Optionally, the transmitting the session request message to the called terminal via the WEBRTC signaling gateway device corresponding to the gateway identifier specifically includes:

determining that the WEBRTC signaling gateway device accessed by the called terminal is the first WEBRTC signaling gateway device according to the gateway identifier, and transmitting the session request message to the called terminal.

Optionally, the transmitting the session request message to the called terminal via the WEBRTC signaling gateway device corresponding to the gateway identifier specifically includes:

determining that the WEBRTC signaling gateway device accessed by the called terminal is a second WEBRTC signaling gateway device according to the gateway identifier, and transmitting the session request message to the second WEBRTC signaling gateway device, so as to enable the second WEBRTC signaling gateway device to transmit the session request message to the called terminal.

The receiving the session response message transmitted by the called terminal includes:

after the called terminal transmits the session response message to the second WEBRTC signaling gateway device, receiving the session response message transmitted by the second WEBRTC signaling gateway device.

Optionally, the session request message includes media candidate address information of the calling terminal, and the session response message includes media candidate address information of the called terminal.

Correspondingly, the establishing, by the calling terminal, the end-to-end media channel between the calling terminal and the called terminal according to the session response message specifically includes:

The calling terminal establishes the end-to-end media channel between the calling terminal and the called terminal according to the media candidate address information of its own and the media candidate address information of the called terminal.

Persons skilled in the art may clearly know that, for the purpose of convenient and brief description, for a specific working process and descriptions of the described WEBRTC signaling gateway device, reference may be made to a corresponding process in the foregoing method embodiments, which will not be repeated herein.

Figure 9:
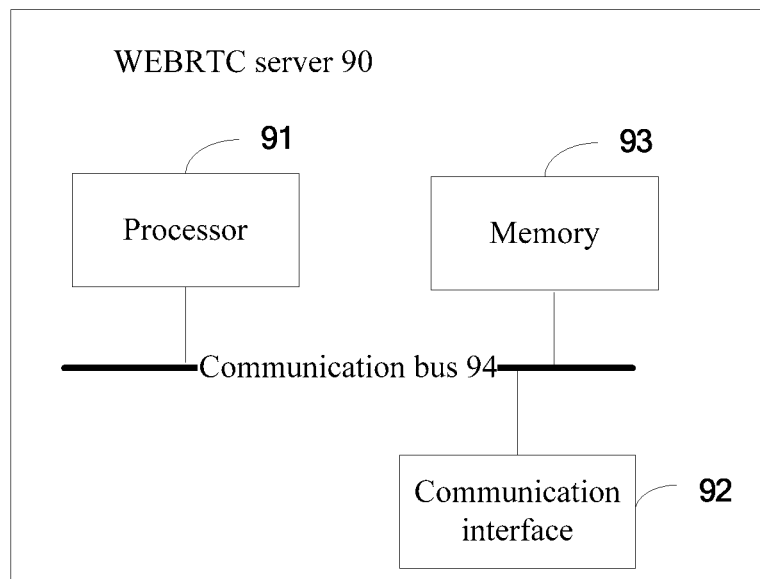
FIG. 9 is a schematic structural diagram of another WEBRTC server according to an embodiment of the present disclosure.

An embodiment of the present disclosure provides another WEBRTC server 90, as shown in FIG. 9, the WEBRTC server 90 includes:

A processor 91, a communication interface 92, a memory 93 and a communication bus 94, where the processor 91, the communication interface 92 and the memory 93 complete communications therebetween via the communication bus 94.

The processor 91 may be a multi-core central processing unit CPU, or an application specific integrated circuit (ASIC), or one or more integrated circuits configured to implement embodiments of the present disclosure.

The memory 93 is configured to store program code, where the program code includes computer instruction and a network flow graph. The memory 93 may include a high-speed RAM memory, and may also include a non-volatile memory, such as at least one disk memory. The memory 93 may also be a memory array. The memory 93 may also be divided into blocks, and the blocks may be combined into a virtual volume according to a certain rule.

The communication interface 92 is configured to implement connections and communications between these apparatus.

The processor 91 is configured to execute program codes in the memory 93 so as to perform the following operations:

after a first WEBRTC signaling gateway device receives a session request message transmitted by a calling terminal, receiving a query request message transmitted by the first WEBRTC signaling gateway device, where the query request message includes an identifier of a called terminal, and where the calling terminal is a WEBRTC terminal;

determining an access mode in which the called terminal accesses a WEBRTC signaling gateway device and a gateway identifier of the WEBRTC signaling gateway device accessed by the called terminal according to the identifier of the called terminal, where the access mode includes accessing via WEB; and transmitting the access mode in which the called terminal accesses the WEBRTC signaling gateway device and the gateway identifier of the WEBRTC signaling gateway device accessed by the called terminal to the first WEBRTC signaling gateway device, so as to enable the first WEBRTC signaling gateway device to determine that the called terminal is the WEBRT terminal according to the access mode, transmit the session request message to the called terminal via the WEBRTC signaling gateway device corresponding to the gateway identifier, and transmit a received session response message to the calling terminal to enable the calling terminal to establish an end-to-end media channel between the calling terminal and the called terminal according to the session response message.

Optionally, the determining the access mode in which the called terminal accesses the WEBRTC signaling gateway device and the gateway identifier of the WEBRTC signaling gateway device accessed by the called terminal according to the identifier of the called terminal specifically includes:

querying a corresponding relation stored therein according to the identifier of the called terminal, and determining the access mode in which the called terminal accesses the WEBRTC signaling gateway device and the gateway identifier of the WEBRTC signaling gateway device accessed by the called terminal, where the corresponding relation includes a corresponding relation among the identifier of the called terminal, the gateway identifier of the WEBRTC signaling gateway device accessed by the called terminal and the access mode in which the called terminal accesses the WEBRTC signaling gateway device.

Optionally, before the receiving the query request message transmitted by the first WEBRTC signaling gateway device, the operations also include:

receiving an authentication message transmitted by the WEBRTC signaling gateway device accessed by the called terminal, where the authentication message includes an access code;

when it is determined that the access code is an access code assigned by the WEBRTC signaling gateway device accessed by the called terminal to the called terminal, storing the corresponding relation among the identifier of the called terminal, the gateway identifier of the WEBRTC signaling gateway device accessed by the called terminal and the access mode in which the called terminal accesses the WEBRTC signaling gateway device.

Optionally, if a WEBRTC server accessed by the called terminal is another WEBRTC server, before the receiving the query request message transmitted by the first WEBRTC signaling gateway device, the operations also include:

receiving a corresponding relation among the identifier of the called terminal, the gateway identifier of the WEBRTC signaling gateway device accessed by the called terminal and the access mode in which the called terminal accesses the WEBRTC signaling gateway device, where the corresponding relation is transmitted by the another WEBRTC server;

where the corresponding relation is stored when the another WEBRTC server receives an authentication message including an access code and it is determined that the access code is an access code assigned by the WEBRTC signaling gateway device accessed by the called terminal to the called terminal, where the authentication message is transmitted by the WEBRTC signaling gateway device accessed by the called terminal.

Optionally, the operations also include: after the called terminal is disconnected from the corresponding WEBRTC signaling gateway device, receiving an update request message transmitted by the WEBRTC signaling gateway device corresponding to the called terminal, and modifying the access mode in which the called terminal accesses the WEBRTC signaling gateway device according to the update request message.

Persons skilled in the art may clearly know that, for the purpose of convenient and brief description, for a specific working process and descriptions of the described WEBRTC server, reference may be made to a corresponding process in the foregoing method embodiments, which will not be repeated herein.

The above descriptions are merely specific embodiments of the present disclosure; however, the protection scope of the present disclosure is not limited thereto. Any modification or replacement that may be readily envisaged of by persons skilled in the art within the technical scope disclosed in the present disclosure should fall into the protection scope of the present disclosure. Thus, the protection scope of the present disclosure shall be subject to the claims.

What is claimed is:

1. A method for establishing a channel, comprising:
receiving, by a first web real-time communication (WEBRTC) signaling gateway device, a session request message transmitted by a calling terminal, wherein the session request message comprises an identifier of a called terminal, and wherein the calling terminal is a WEBRTC terminal;
transmitting, by the first WEBRTC signaling gateway device, a query request message comprising the identifier of the called terminal to a WEBRTC server, and receiving, by the first WEBRTC signaling gateway device, an access mode in which the called terminal accesses a WEBRTC signaling gateway device and a gateway identifier of the WEBRTC signaling gateway device accessed by the called terminal, wherein the access mode and the gateway identifier are transmitted by the WEBRTC server, and wherein the access mode comprises accessing via a web browser;

determining, by the first WEBRTC signaling gateway device, that the called terminal is a WEBRTC terminal according to the access mode, and transmitting the session request message to the called terminal via the WEBRTC signaling gateway device corresponding to the gateway identifier; and receiving, by the first WEBRTC signaling gateway device, a session response message transmitted by the called terminal, and transmitting, by the first WEBRTC signaling gateway device, the session response message to the calling terminal, to enable the calling terminal to establish an end-to-end media channel between the calling terminal and the called terminal according to the session response message.

2. The method according to claim 1, wherein, the transmitting, the session request message to the called terminal via the WEBRTC signaling gateway device corresponding to the gateway identifier comprises:

determining, by the first WEBRTC signaling gateway device, that the WEBRTC signaling gateway device accessed by the called terminal is the first WEBRTC signaling gateway device according to the gateway identifier, and transmitting, by the first WEBRTC signaling gateway device, the session request message to the called terminal.

3. The method according to claim 1, wherein, the transmitting the session request message to the called terminal via the WEBRTC signaling gateway device corresponding to the gateway identifier comprises:

determining, by the first WEBRTC signaling gateway device, that the WEBRTC signaling gateway device accessed by the called terminal is a second WEBRTC signaling gateway device according to the gateway identifier, and transmitting, by the first WEBRTC signaling gateway device, the session request message to the second WEBRTC signaling gateway device, to enable the second WEBRTC signaling gateway device to transmit the session request message to the called terminal;

the receiving, by the first WEBRTC signaling gateway device, the session response message transmitted by the called terminal comprises:

after the called terminal transmits the session response message to the second WEBRTC signaling gateway device, receiving, by the first WEBRTC signaling gateway device, the session response message transmitted by the second WEBRTC signaling gateway device.

4. The method according to claim 1, wherein, the session request message comprises media candidate address information of the calling terminal, the session response message comprises media candidate address information of the called terminal;

correspondingly, the establishing, by the calling terminal, the end-to-end media channel between the calling terminal and the called terminal according to the session response message comprises:

establishing, by the calling terminal, the end-to-end media channel between the calling terminal and the called terminal according to the media candidate address information of the calling terminal and the media candidate address information of the called terminal.

5. A web real-time communication (WEBRTC) signaling gateway device, comprising:

a processor; and a non-transitory computer readable medium having a plurality of computer readable instructions stored thereon that, when executed by the processor, cause the processor to implement:

receiving a session request message transmitted by a calling terminal and a session response message transmitted by a called terminal, wherein the session request message comprises an identifier of the called terminal, and wherein the calling terminal is a WEBRTC terminal;

transmitting a query request message comprising the identifier of the called terminal to a WEBRTC server, and receiving an access mode in which the called terminal accesses a WEBRTC signaling, gateway device and a gateway identifier of the WEBRTC signaling gateway device accessed by the called terminal, wherein the access mode and the gateway identifier are transmitted by the WEBRTC server, and wherein the access mode comprises accessing via a web browser;

determining that the called terminal is a WEBRTC terminal according to the access mode, and transmitting the session request message to the called terminal via the WEBRTC signaling gateway device corresponding to the gateway identifier; and receiving a session response message transmitted by the called terminal, and transmitting the session response message to the calling terminal, to enable the calling terminal to establish an end-to-end media channel between the calling terminal and the called terminal according to the session response message.

6. The WEBRTC signaling gateway device according to claim 5, wherein, the transmitting the session request message to the called terminal via the WEBRTC signaling gateway device corresponding to the gateway identifier comprises:

determining that the WEBRTC signaling gateway device accessed by the called terminal is the first WEBRTC signaling gateway device according to the gateway identifier, and transmitting the session request message to the called terminal.

7. The WEBRTC signaling gateway device according to claim 5, wherein, the transmitting the session request message to the called terminal via the WEBRTC signaling gateway device corresponding to the gateway identifier comprises:

determining that the WEBRTC signaling gateway device accessed by the called terminal is a second WEBRTC signaling gateway device according to the gateway identifier, and transmitting the session request message to the second WEBRTC signaling gateway device, to enable the second WEBRTC signaling gateway device to transmit the session request message to the called terminal;

correspondingly, the receiving the session response message transmitted by the called terminal comprises:

after the called terminal transmits the session response message to the second WEBRTC signaling gateway device, receiving the session response message transmitted by the second WEBRTC signaling gateway device.

8. The WEBRTC signaling gateway device according to claim 5, wherein, the session request message comprises media candidate address information of the calling terminal, the session response message comprises media candidate address information of the called terminal;

correspondingly, the establishing, by the calling terminal, the end-to-end media channel between the calling terminal and the called terminal according to the session response message comprises:

establishing, by the calling terminal, the end-to-end media channel between the calling terminal and the called terminal according to the media candidate address information of the calling terminal and the media candidate address information of the called terminal.

9. A web real-time communication (WEBRTC) server, comprising:

a processor; and a non-transitory computer readable medium having a plurality of computer readable instructions stored thereon that, when executed by the processor, cause the processor to implement:

after a first WEBRTC signaling gateway device receives a session request message transmitted by a calling terminal, receiving a query request message transmitted by the first WEBRTC signaling gateway device, wherein the query request message comprises an identifier of a called terminal, and wherein the calling terminal is a WEBRTC terminal;

determining, according to the identifier of the called terminal, an access mode in which the called terminal accesses a WEBRTC signaling gateway device and a gateway identifier of the WEBRTC signaling gateway device accessed by the called terminal, wherein the access mode comprises accessing via a web browser;

transmitting the access mode in which the called terminal accesses the WEBRTC signaling gateway device and the gateway identifier of the WEBRTC signaling gateway device accessed by the called terminal to the first WEBRTC signaling gateway device, to enable the first WEBRTC signaling device to determine that the called terminal is a WEBRT terminal according to the access mode, transmitting the session request message to the called terminal via the WEBRTC signaling gateway device corresponding to the gateway identifier, and transmitting a received session response message to the calling terminal to enable the calling terminal to establish an end-to-end media channel between the calling terminal and the called terminal according to the session response message.

10. The WEBRTC server according to claim 9, wherein, the determining the access mode in which the called terminal accesses the WEBRTC signaling gateway device and the gateway identifier of the WEBRTC signaling gateway device accessed by the called terminal according to the identifier of the called terminal comprises: querying a corresponding relation stored therein according to the identifier of the called terminal, and determining the access mode in which the called terminal accesses the WEBRTC signaling gateway device and the gateway identifier of the WEBRTC signaling, gateway device accessed by the called terminal, wherein the corresponding relation comprises a corresponding relation among the identifier of the called terminal, the gateway identifier of the WEBRTC signaling gateway device accessed by the called terminal and the access mode in which the called terminal accesses the WEBRTC signaling gateway device.

11. The WEBRTC server according to claim 9, wherein, the non-transitory computer readable medium also has computer readable instructions stored thereon that, when executed by the processor, cause the processor to implement: before receiving the query request message transmitted by the first WEBRTC signaling gateway device, receiving an authentication message transmitted by the WEBRTC signaling gateway device accessed by the called terminal, wherein the authentication message comprises an access code;

when it is determined that the received access code is an access code assigned by the WEBRTC signaling gateway device accessed by the called terminal to the called terminal, storing the corresponding relation among the identifier of the called terminal, the gateway identifier of the WEBRTC signaling gateway device accessed by the called terminal and the access mode in which the called terminal accesses the WEBRTC signaling gateway device.

12. The WEBRTC server according to claim 9, wherein, the non-transitory computer readable medium also has computer readable instructions stored thereon that, when executed by the processor, cause the processor to implement: if the WEBRTC server accessed by the called terminal is another WEBRTC server, receiving a corresponding relation among the identifier of the called terminal, the gateway identifier of the WEBRTC signaling gateway device accessed by the called terminal and the access mode in which the called terminal accesses the WEBRTC signaling gateway device, wherein the corresponding relation is transmitted by the another WEBRTC server;

wherein the corresponding relation is stored when the another WEBRTC server receives an authentication message comprising an access code and it is determined that the access code is an access code assigned by the WEBRTC signaling gateway device accessed by the called terminal to the called terminal, wherein the authentication message is transmitted by the WEBRTC signaling gateway device accessed by the called terminal.

13. The WEBRTC server according to claim 10, wherein, the non-transitory computer readable medium also has computer readable instructions stored thereon that, when executed by the processor, cause the processor to implement:

after the called terminal is disconnected from the corresponding WEBRTC signaling gateway device, receiving an update request message transmitted by the WEBRTC signaling gateway device corresponding to the called terminal; and modifying the access mode in which the called terminal accesses the WEBRTC signaling gateway device according to the received update request message.

\* \* \* \* \*